United States Patent [19]

Fergusson

[11] Patent Number: 5,244,346
[45] Date of Patent: Sep. 14, 1993

[54] PORTABLE WIND MACHINE

[76] Inventor: Alec H. B. Fergusson, P.O. Box 220, Rialto, Calif. 92377

[21] Appl. No.: 958,226

[22] Filed: Oct. 8, 1992

Related U.S. Application Data

[63] Continuation-in-part of Ser. No. 652,413, Feb. 7, 1991, abandoned.

[51] Int. Cl.⁵ .................... B63H 1/06; A01G 13/00
[52] U.S. Cl. .................... 416/142; 416/170 R; 416/148; 47/2; 52/40; 52/143; 280/656; 280/763.1
[58] Field of Search ............... 416/170 R, 148, 142; 47/2; 248/676; 52/40, 143; 280/638, 763.1, 656

[56] References Cited

U.S. PATENT DOCUMENTS

| | | | |
|---|---|---|---|
| 1,639,257 | 8/1927 | Cobb | 47/2 |
| 1,903,615 | 4/1933 | Towt | 47/2 |
| 2,165,148 | 7/1939 | Nelson et al. | |
| 2,231,454 | 2/1941 | Saxe | 47/2 |
| 2,481,702 | 9/1949 | Towt | |
| 2,602,267 | 7/1952 | Neundorfer | |
| 2,661,068 | 12/1953 | Gaskill | |
| 2,736,137 | 2/1956 | Thaheld | 47/2 |
| 2,800,746 | 7/1957 | Harmon | |
| 2,807,120 | 9/1957 | Graham | 47/2 |
| 2,836,932 | 6/1958 | Potter | |
| 3,055,145 | 9/1962 | Lindsay | |
| 3,243,890 | 4/1966 | Easterday | |
| 3,409,221 | 11/1968 | Patterson | 47/2 |
| 4,501,089 | 2/1985 | Cobden | |
| 4,753,034 | 6/1988 | Brown | |
| 4,838,761 | 6/1989 | Sheppard | |

FOREIGN PATENT DOCUMENTS

| | | | |
|---|---|---|---|
| 217767 | 3/1961 | Austria | 47/2 |
| 1147078 | 4/1963 | Fed. Rep. of Germany | 47/2 |

OTHER PUBLICATIONS

"Wind Machines Fight Jack Frost" 1922.
"Oil Heat Saves Fruit" Feb. 1938.
"Crank Up Towers" not dated.

Primary Examiner—Thomas E. Denion
Attorney, Agent, or Firm—Gordon L. Peterson

[57] ABSTRACT

A portable wind machine comprising a vehicle movable along the ground and a support carried by the vehicle and extending upwardly substantially above the vehicle. A transverse member is coupled to the support at a location substantially above the vehicle, and it extends transversely of the support on both sides of the support. The transverse member is pivotable between a travel position in which the transverse member extends generally along the vehicle in generally a direction from fore to aft of the vehicle and an operational position in which the transverse member extends laterally of the vehicle. First and second propellers are mounted on the transverse member on opposite sides of the support for rotation about first and second rotational axes, respectively. A tilt angle between each of the rotational axes and a vertical plane is adjustable. At least one power source is provided for rotating the propellers.

22 Claims, 7 Drawing Sheets

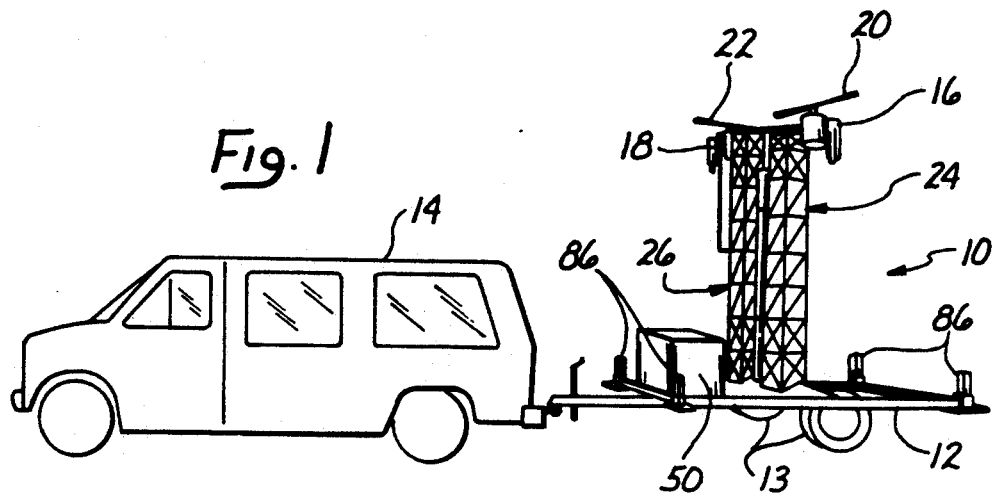
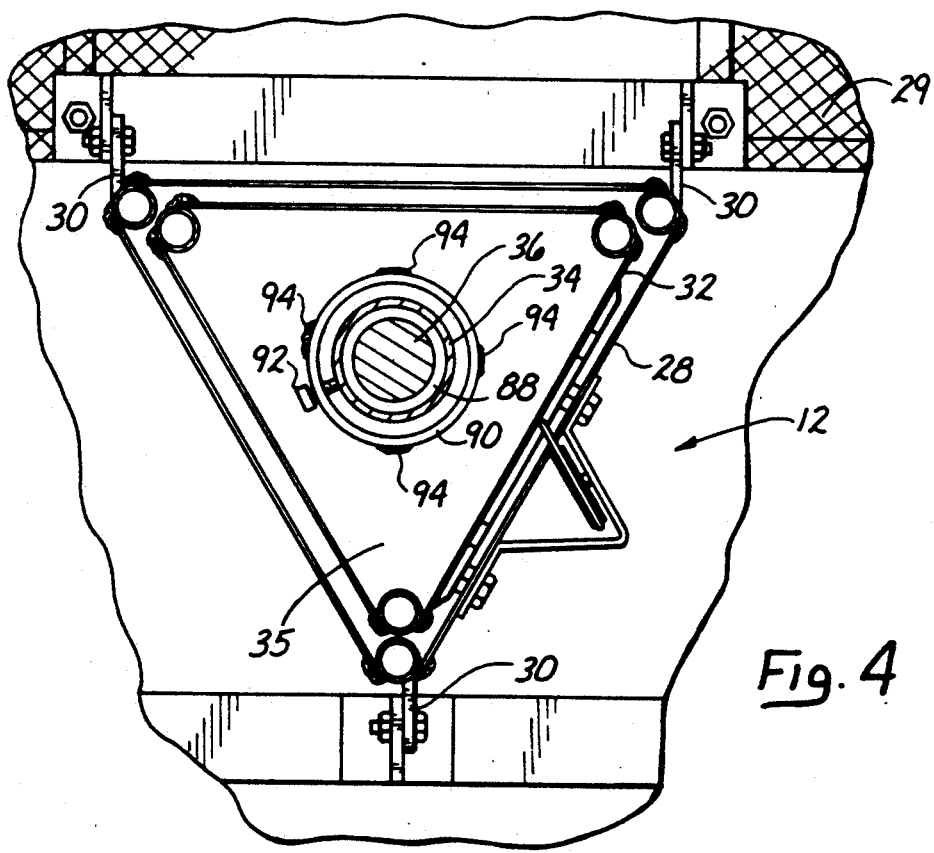

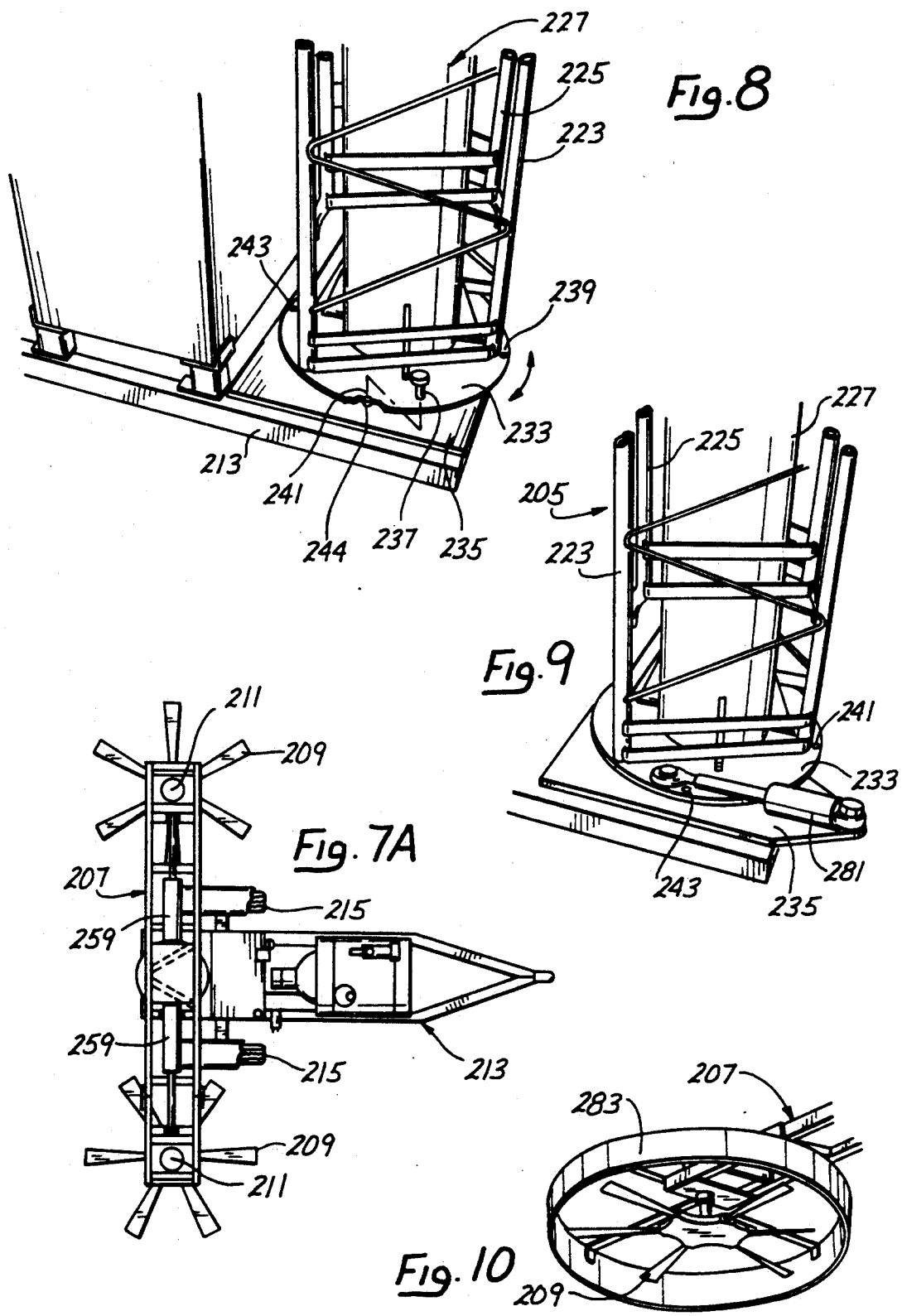

PORTABLE WIND MACHINE

BACKGROUND OF THE INVENTION

Cross Reference to Related Application

This application is a continuation-in-part of application Ser. No. 652,413 filed on Feb. 7, 1991 now abandoned.

TECHNICAL FIELD

This invention relates generally to blower fans, and more particularly to a new type of portable wind machine useful for crop frost prevention or for drying various surfaces or crops, and easily transportable from place to place.

BACKGROUND INFORMATION

Wind machines are commonly used to prevent frost damage to vulnerable crops. Frost is often caused by a temperature inversion which produces a cold layer of atmosphere, often not more than fifteen feet deep, that hovers close to the ground. Thus, by circulating the warmer air from above the inversion down and through the crop, the frost can often be prevented and the crop saved. In citrus orchards, where one heavy frost can cause severe crop and tree damage, permanent wind machines are often positioned throughout the orchard. These machines typically consist of a single propeller mounted on a tall pole, which is permanently mounted in the ground at its base. The propeller may be driven either by an electric motor or a combustion engine, and the pole is sufficiently tall to ensure that the propeller will be above the inversion layer and able to circulate the warmer upper air effectively.

While such permanent wind machines are useful for crops such as citrus fruit where the threat of frost is an ongoing one, they are prohibitively expensive for other types of crops which are only vulnerable to an unusual late Spring or early Fall frost. They are also impractical for performing other useful functions of wind machines, such as drying crops like strawberries, grapes, onions, and other row crops which can be damaged by a late Spring rain, or for drying other surfaces which have been soaked by a heavy rain or dew, such as athletic fields, race tracks, golf courses, and streets which are to be paved. For such applications, a portable wind machine is needed, which can be moved to the desired locale to complete a task and then moved to another site.

One type of prior art portable wind machine includes a propeller-type fan which is mounted on a trailer or the like on a low stand. One such machine is shown, for example, in Neundorfer U.S. Pat. No. 2,602,267. Because of its low height, it is easily transported, but is not as effective in preventing frost damage, since it is incapable of circulating warm upper level air. Furthermore, it is not effective over as large a ground area because of its lack of height. An additional drawback is the danger of injury because of the easily accessible fan blades positioned so close to the ground.

A second type of machine is a propeller-type fan which is mounted on a trailer or the like on a taller stand. This type is more effective for preventing frost and for drying large sectors of fields or streets, but if made sufficiently tall is difficult to transport. If it is tall enough for its intended purpose, it may be too tall to fit under overpasses and makes the handling characteristics of the towing vehicle much worse because of a great deal of wind resistance.

SUMMARY OF THE INVENTION

This invention solves the problem outlined above. This invention provides a portable wind machine which is preferably adjustable in height. It is capable of being extended to a significant height for operation in preventing frost or drying a surface, and of being shortened in height for easy portability from place to place.

The invention may be embodied in a first embodiment in a portable wind machine which includes adjustable height means that may comprise at least one and preferably two support towers.

The support tower is adapted for mounting to a readily transportable platform, such as a wheeled vehicle which may be a trailer.

The wind machine further includes at least one propeller, which is suitably mounted on the support tower as by a transverse member or fly bar cross beam. If two propellers are employed, as in the preferred embodiment, one of them may be mounted adjacent each end of the fly bar cross beam. The propellers are mounted on a vertical axis, which provides a much better circulation of warm upper level air through the crop area than does a horizontal axis configuration. In the two propeller embodiment, the propellers counter-rotate, to minimize thrust loading on the tower structure. At least one power generating means is employed to rotatably drive the propeller or propellers. Each support tower may be comprised of a plurality of sections which are telescopically connected to one another so that the height of the support tower or towers may be varied by extending or retracting the upper sections, thereby allowing a substantial variation in the height of the propeller or propellers above the platform.

In the preferred embodiment, the power generating means comprises a combustion engine or engines, though electric motors or a power takeoff from ground-based equipment could be used as well. One engine is preferably utilized for each propeller, and may be mounted on the fly bar cross beam near the propeller, with a vertical shaft extending from the engine on which the propeller is mounted.

An upper fuel tank is mounted near the engine or engines. A lower fuel tank having a quantity of fuel is mounted near the base end of the support tower. The upper fuel tank has a level sensor for sensing the fuel level in the tank, which has preset lower and upper limits and which actuates a fuel pump when the upper fuel tank fuel level falls below the lower limit, thereby pumping fuel from the lower fuel tank to the upper fuel tank. The level sensor shuts off the fuel pump when the upper tank fuel level increases above the upper preset limit.

An upwardly extending fuel line has a first rigid conduit portion which extends upwardly along the lowermost support tower section, and is fastened to that section for support. The fuel line further has a second flexible hose portion, which extends upwardly from the top of the first rigid conduit portion to the upper fuel tank. This flexible portion has sufficient extra length to compensate for the difference in tower height when the telescoping tower sections are retracted versus when they are extended. A hose collector is mounted to the support tower and collects the excess length of flexible hose when the telescoping tower sections are retracted.

Each support tower may be constructed of a base section and a top section, with the top section nesting within the base section when in a retracted position. The top section may comprise an outer tube and an inner telescoping rod, with the inner rod nesting within the outer tube when in the retracted position. When the propeller or propellers are actuated to rotate, a thrust is developed, akin to that of a helicopter, which pulls the inner rod upwardly out of the outer tube in telescopic fashion to a fully extended position. Accordingly, operation of the propeller automatically extends the adjustable height means from a lower position to a higher position.

The adjustable height means and the propeller are moved by gravity from the higher position to the lower position. As a safety feature, the wind machine preferably includes dampening means for dampening movement of the adjustable height means and the propeller from the higher position to the lower position. This may be accomplished, for example, by the use of hydraulic oil between the outer tube and the inner rod so that when the propeller ceases to be rotated, the inner rod retracts back into the outer tube, with the hydraulic oil dampening the retraction stroke.

Each support tower may further be constructed of a first base section, which is adapted for mounting to the readily transportable platform, and a second section which has a base plate and is nested telescopically within the first base section when in a retracted position. The second section is capable of extension above the top of the first base section so that when it is fully extended, only a small lower portion of the second portion remains nested within the lower base portion. The second section can be extended by various different techniques including a winch and cable system. When multiple towers are employed, a single winch and cable system may be used to extend and retract both towers. The support tower preferably extends the propeller along a linear path of substantial length.

An additional feature of the invention is an engine control means which continually monitors the first and second engine rotational speeds. When it detects a sharp reduction in rotational speed of one engine indicative of a shutdown of that engine, it immediately shuts down the other engine as well. This prevents structural damage to the wind machine caused by the unbalanced operation of only one propeller at one end of the fly bar cross beam.

A second embodiment of portable wind machine has features which further facilitate transporting of the wind machine over public highways to the area where artificial wind from the wind machine is desired. This second embodiment also has features which enhance its flexibility for drying of row crops, tree crops and surfaces, to harvest crops such as nuts and figs by blowing them off of trees and to reduce or prevent frost damage.

The second embodiment of portable wind machine includes a vehicle movable along the ground and a support carried by the vehicle and extending upwardly substantially above the vehicle. A transverse member is coupled to the support at a location substantially above the vehicle, and it extends transversely of the support on both sides of the support. First and second propellers are mounted on the transverse member on opposite sides of the support for rotation about first and second rotational axes, respectively.

The transverse member is pivotable between a travel position in which the transverse member extends generally along the vehicle in generally a direction from fore to aft of the vehicle and an operational position in which the transverse member extends laterally of the vehicle. The transverse member may be pivotable by pivoting it relative to the support. Preferably, however, the support is mounted on the vehicle for pivotable movement about a generally vertical pivot axis relative to the vehicle and the transverse member is fixedly attached to the support for pivotal movement with the support. This allows the tower to be pivoted at vehicle level rather than substantially overhead. To pivot the transverse member on the support adds complexities if it is to be accomplished with a power source and is dangerous to accomplish manually in case the propellers are running.

If desired, an actuator may be carried by the vehicle for oscillating the support about the vertical pivot axis. This may be of advantage in, for example, crop warming or creating wind to keep flies off of cattle in a feed lot.

In the travel position of the transverse member, the propellers lie generally along the vehicle axis so that the vehicle is not unacceptably wide for traveling over highways. On the other hand, in the operational position, the rotational axes of the propellers may lie substantially laterally outwardly of the vehicle. Consequently, a wide swath can be subjected to the action of the propellers as the vehicle is pulled through the region where artificial wind is desired. This also enables the vehicle to be pulled between rows of trees and have the propellers be substantially directly above the trees so that the trees are subjected to the direct action of the air flow from the propellers.

Each of the propellers has a tilt angle between its rotational axis and a vertical plane. Another feature of the second embodiment is that this tilt angle is adjustable to thereby assist in further adapting the wind machine for a multiplicity of uses. For example, preferably the tilt angle for one or both of the propellers is adjustable to allow the associated rotational axis to be generally vertical to provide a tilt angle of 0 degrees. For example, this position is particularly useful for traveling, drying of crops such as row and vine crops, and blowing figs and nuts off of trees for harvesting. Preferably the tilt angle for at least one of the propellers is adjustable through at least about 22 degrees. However, by extending the tilt angle to about 45 degrees a much wider swath or region effected by the wind machine can be created as the wind machine is pulled through the area where artificial wind is desired. Finally, by having a tilt angle of at least 90 degrees which enables the rotational axes to be horizontal, the wind machine is adapted for crop warming purposes.

Preferably in the operational position at least major portions of the first and second propellers are located laterally outwardly of the vehicle in all of the tilt angles. If desired, substantially all of the first and second propellers may be located laterally outwardly of the vehicle in all of the tilt angles. When the tilt angles are such that the rotational axes can be generally vertical, the rotational axes are preferably laterally outwardly of the sides of the vehicle in the operational position.

Although the tilt angles can be varied in different ways, in a preferred construction the transverse member includes an inner section coupled to the support and an outer section. The first propeller is mounted on the outer section and the outer section is typically coupled to the inner section for pivotal movement about a tilt axis to thereby adjust the tilt angle for the first propeller. A stop of any suitable kind is provided for fixing the outer section in any of a plurality of positions about the tilt axis to thereby establish the tilt angle for the first propeller. A similar construction may be employed, if desired, for the second propeller.

Although the outer section may be pivoted about the tilt axis to adjust the tilt angle in many different ways, including manually, this function is preferably accomplished with a fluid actuator, such as a hydraulic or pneumatic actuator. In this event, the fluid actuator also provides the function of being a stop to fix the outer section in the position to establish the desired tilt angle.

A power source of any suitable kind is provided to drive the propellers. In a preferred construction, the power source includes a fluid motor carried by the transverse member for driving the first propeller, a pump for providing fluid under pressure to drive the fluid motor and an engine on the vehicle to drive the pump.

Preferably, although not necessarily, the support is an adjustable height support. In a preferred construction, the adjustable height support includes first and second extendible towers.

In use, the portable wind machine can be moved to an area where artificial wind is desired with the transverse member being in the travel position. The transverse member is then moved to the operational position and the tilt angles are adjusted as desired. The wind machine is then moved in the area where artificial wind is desired with the transverse member in the operational position and with the propellers rotating.

The above mentioned and other objects of the invention and the manner of attaining them will become apparent, and the invention itself will be best understood, by reference to the following description taken in conjunction with the accompanying illustrative drawings.

BRIEF DESCRIPTION OF THE DRAWINGS

FIG. 1 is a side elevation showing a portable wind machine according to the invention, mounted on a trailer and ready for transport;

FIG. 4 is a cross-sectional view along lines 4—4 of FIG. 3, showing details of the three-section support tower.

FIG. 7A is a somewhat schematic top view of the embodiment of FIG. 6 with the transverse member in the operational position and with tilt angles of zero degrees;

FIG. 8 is a fragmentary perspective view illustrating one way for adjusting the angle of the transverse member;

FIG. 9 is a fragmentary perspective view similar to FIG. 8 illustrating an optional feature for oscillating the support and the transverse member;

FIG. 10 is a perspective view of an alternate construction in which a shroud is provided around the propellers.

DESCRIPTION OF THE PREFERRED EMBODIMENT

Figure 2:
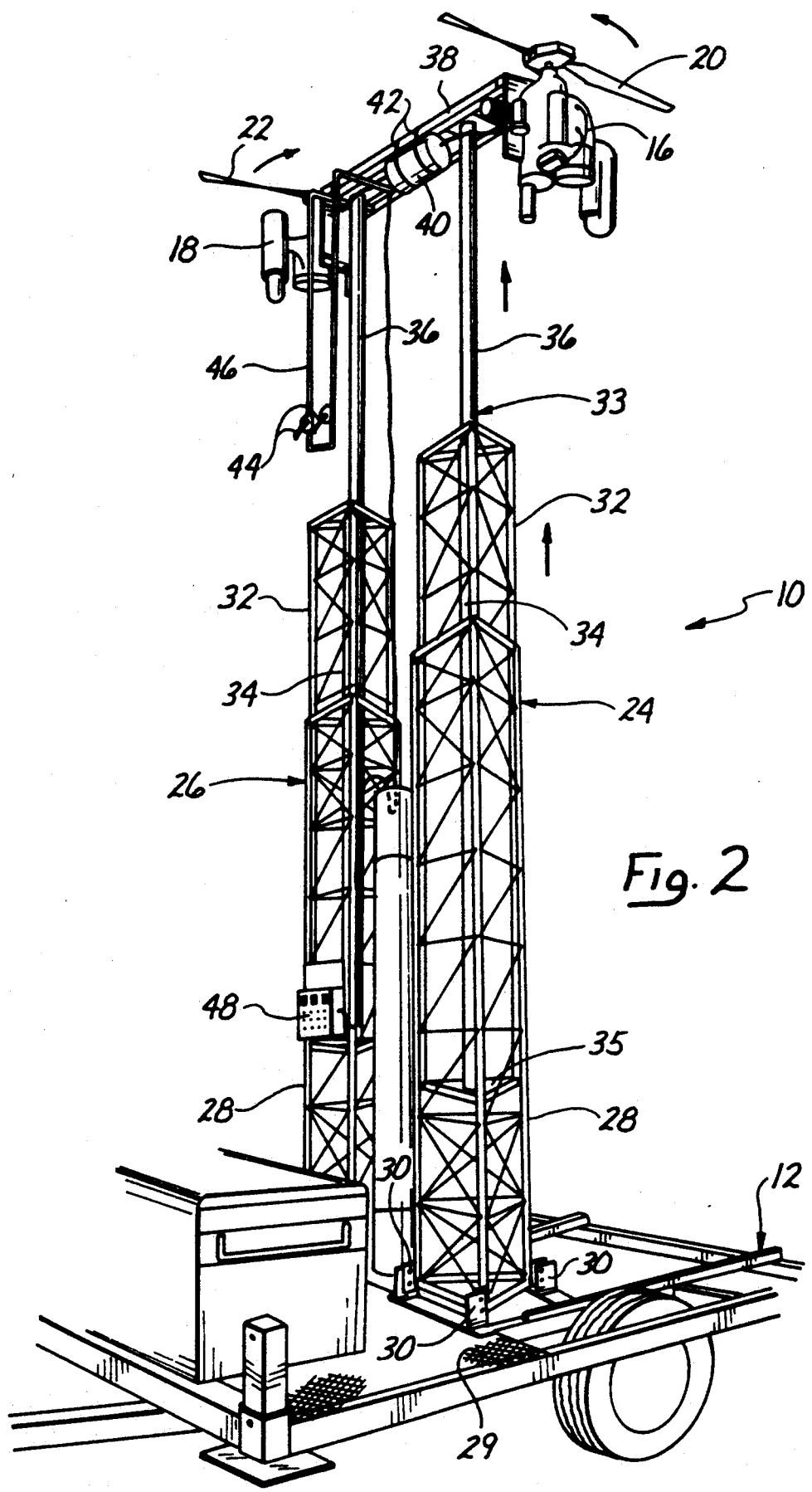
FIG. 2 is a perspective view showing certain structural details of the portable wind machine.

Referring now to FIG. 1, there is shown a portable wind machine 10 according to the invention. The wind machine 10 is adapted to be mounted on a trailer 12 having wheels 13, which in turn is towed by a vehicle 14. The portable wind machine 10 comprises a pair of engines 16 and 18 which drive a pair of propellers 20 and 22, respectively. Engines 16 and 18 are supported by twin support towers 24 and 26 which are mounted at their base to the trailer 12.

Figure 3:
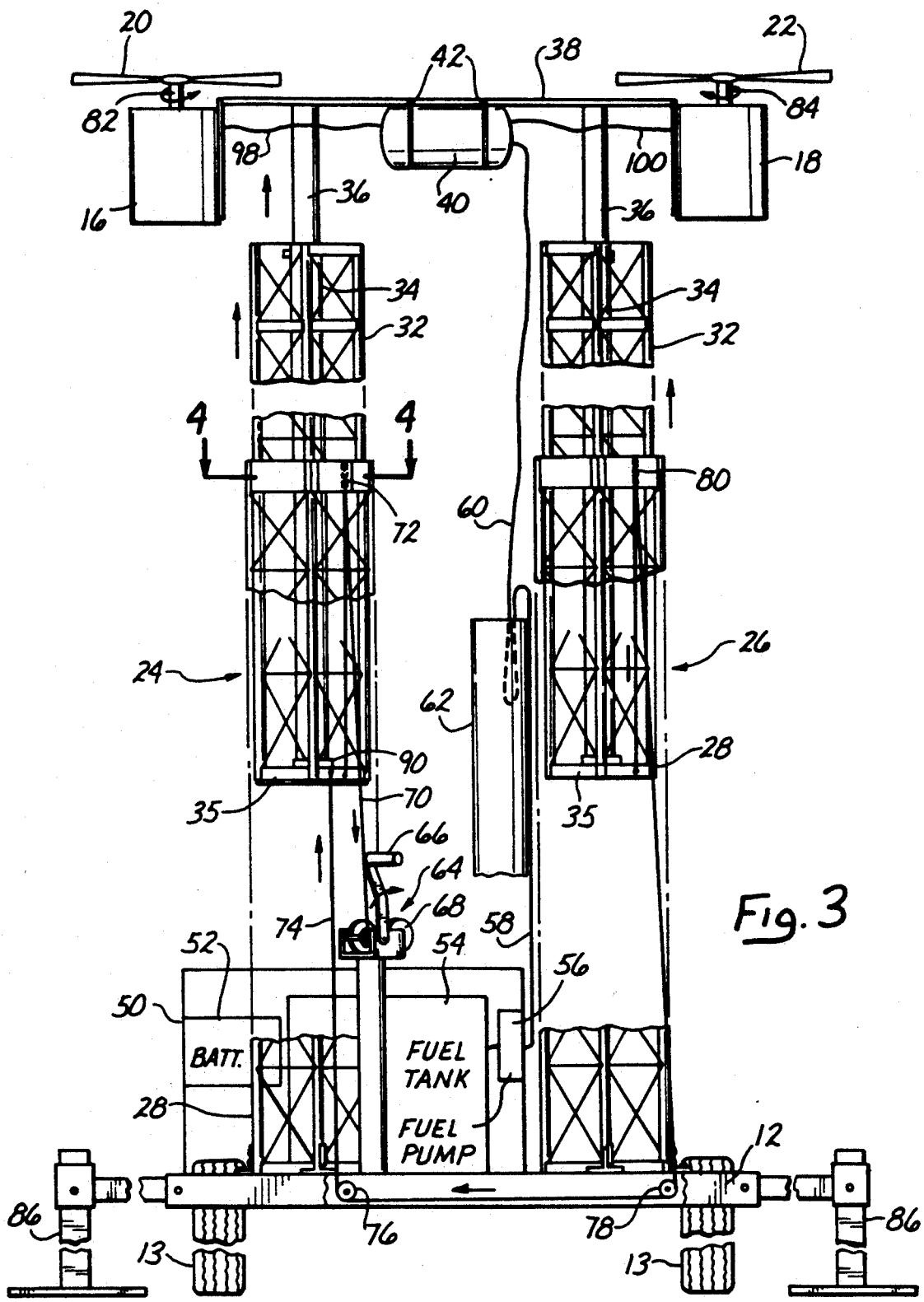
FIG. 3 is a rear view of the portable wind machine, showing details of the support tower crank-up structure and of the fuel system.

Viewing FIGS. 2 and 3, structural details of the wind machine 10 may be seen. Towers 24 and 26 are substantially identical and are each constructed of three sections. Base section 28 is bolted to a bed 29 of the trailer 12 by means of flanges 30. Telescoping second section 32 nests inside of the base section 28, and may be extended upwards by a hand winch and cable system, which are described in greater detail below. Commercially available crank-up towers may be used to construct the first two tower sections 28 and 32.

Third section 33 comprises a first or outer tube 34, the base of which is mounted on a base plate 35 of second section 32. Inside of tube 34 nests a second or inner member or rod 36 which can be extended upwardly above the top of tube 34 to allow the unit to operate at a maximum height with the tower fully extended.

Mounted horizontally across the tops of the two rods 36 is a support member or fly bar cross beam 38. The two engines 16 and 18 are attached to the fly bar cross beam 38, one at each end. Beneath the center portion of the fly bar cross beam, between the two mounting regions for the rods 36, is an upper fuel tank 40, which is fastened to the fly bar cross beam by means of straps 42. Engine throttle valves 44 are mounted on frame member 46, which in turn is mounted on the fly bar cross beam 38. Engine control panel 48 is attached to the base section 28 of tower 26 and contains various engine monitoring instruments, automatic controls and a manual on/off switch for each engine, all of which are discussed in greater detail below.

Accessory box 50, which is mounted on the bed 29 of the trailer 12, houses one or more batteries 52 for starting the engines 16 and 18 and otherwise providing auxiliary electrical power. Box 50 additionally houses a lower fuel tank 54, and a fuel pump 56. Extending from the fuel pump 56, and up the side of tower 26, is a rigid galvanized fuel line 58, the line being fastened to the side of the tower for support. Near the top of the base tower section 28, the fuel line transitions to a flexible hose 60, which is connected at its upper end to the upper fuel tank 40. The flexible hose 60 hangs freely from the upper fuel tank and has considerable slack, which is collected in a hose collector 62. The hose collector 62 is fastened to the side of the tower 26, on base section 28. The flexible hose, having excess length, is necessary to accommodate the changes in tower height as the tower is extended. As the top two tower sections rise, slack is taken from the hose collector to cover the increased distance from the top of the base tower section 28 to the upper fuel tank 40.

On tower 24 is mounted a hand winch 64 which is rotated by means of a handle 66. Of course, an electric winch could instead be used, if desired. The winch is used to crank up the second tower sections 32 when extending the tower to its maximum height operating position, and the cable system is advantageously arranged so that both sections 32 are raised in unison, in order to maintain balanced loads. This dual crank-up system is a great improvement over that available on the commercially available towers, which only contemplates cranking up by means of a hand winch a single tower section for a single tower.

From a spool 68 of the winch 64, cable 70 passes around pulley 72 rotatably mounted on tower section 28 and is attached to the top surface of the second section base plate 35 on tower 24. Cable 74 is fastened to the bottom surface of the same base plate 35 and passes around pulleys 76 and 78 on the trailer 12 and pulley 80 on tower section 28 of the tower 26 after which it is attached to the top surface of the second section base plate 35 on tower 26. Thus, when handle 66 is cranked clockwise in the direction shown by the arrow, winding the cable 70 about the spool 68, the second section 32 on tower 24 is lifted upwardly, thus extending the length of the tower telescopically toward its maximum height operating position. The upward movement of the base plate 35 on tower 24 in turn pulls the cable 74 about the pulleys 76, 78, and 80, causing the base plate 35 on tower 26 to be lifted upwardly as well, for a distance equal to that by which the plate 35 on tower 24 is lifted. Therefore, second section 32 on tower 26 is extended by the same length and at the same rate as is the second section 32 on tower 24, thereby maintaining balanced loading factors on the entire structure and ensuring a quick and efficient crank-up procedure.

In the preferred embodiment, engines 16 and 18 comprise lightweight two-cycle, two cylinder gasoline aircraft engines, developing 35 horsepower. Propellers 20 and 22 are made of glass epoxy, and are pitch adjustable when the unit is not operating. The propellers are mounted on shafts 82 and 84, respectively, such that they rotate about vertical axes. As denoted by the arrows in FIG. 3, the propellers are arranged to be counter-rotating in order to minimize the moment on tower structures 24 and 26. When the unit is in an operational mode, jack stands 86 (four being illustrated) on the trailer may be extended if desired to provide stability to the structure.

Viewing FIGS. 3 and 4 together, it can be seen that between first tube 34 and rod 36 is a circumferential gap 88, which is filled with a fluid such as hydraulic oil or air. Tube 34 is surrounded at its base by a base ring 90, and is attached to the base ring 90 by any suitable means, such as one or more bolts 92. The base ring 90 is attached to the base plate 35 of the second tower section 32 by means of welds 94, although any other conventional fastening means, such as bolts, could be employed.

Figure 5:
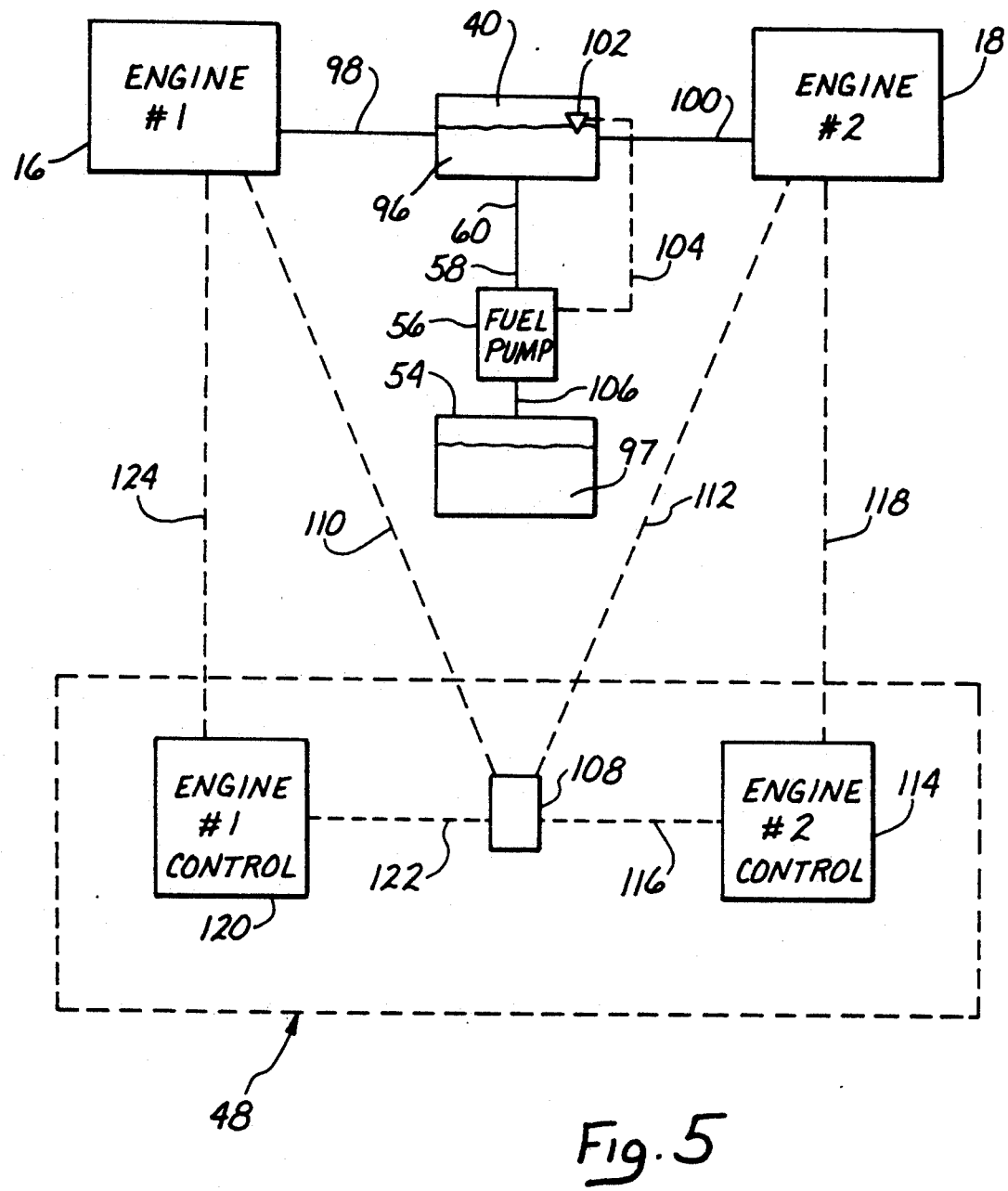
FIGS. 5 is a schematic diagram showing certain features of the engine control and fuel supply systems.

Now referring to FIG. 5, certain engine control and fuel system control details are illustrated. As noted above, the fuel system includes the upper fuel tank 40 having a certain level of fuel 96 and the lower fuel tank 54 having a quantity of fuel 97. Each engine 16, 18 has its own fuel pump (not shown), driven by crankcase pressure, by which it may pump fuel from a tank for operation. However, these fuel pumps are inadequate to pump fuel from the main fuel tank 54 up the span of the tower when the tower is fully extended. Therefore, the additional fuel pump 56 is employed, which pumps fuel from the lower tank 54, which has a capacity of approximately 25 gallons in the preferred embodiment, to the upper tank 40, which has a capacity of approximately 2 gallons in the preferred embodiment, though tanks with different capacities could be employed in either role. From the upper tank 40, the engine fuel pumps can pump the necessary fuel for operation of the engines through fuel lines 98 and 100. Fuel pump 56 can be actuated manually by an on/off switch in the control box 48, but is usually actuated automatically to replenish tank 40 when the level of the fuel 96 in the tank becomes low. To do this, a level sensor such as a float switch 102 in the tank 40 is preset to send a control signal through control line 104 when the fuel level drops below a critical setpoint. This signal actuates the fuel pump 56 to pump additional fuel through fuel line 58 and 60 into the tank 40 until the fuel level is restored to a preset upper level, at which point the float switch 102 actuates the pump 56 to shut off. This cycle is repeated every time the upper tank fuel level gets low, until the wind machine is shut off or the fuel in lower tank 97 is exhausted.

Control box 28 contains a number of typical engine controls and gauges. For example, both engines may be shut off manually at the control box at any time. Additionally, the engine starting controls are located at the control box, although the throttles 44 are mounted on the fly bar cross beam 38, as explained above. Gauges may include engine temperature, amperage, and fuel monitoring instruments, all of which may alert the operator to a potential engine problem to which he may respond by shutting down the engines. However, a unique feature of this invention addresses a significant concern that one engine will shut down because of a mechanical failure, a lack of fuel, or a careless operator while the other engine remains at full operating speed. This would be a potentially dangerous situation, because of the moment placed upon the structure if only one propeller is rotating. When both propellers are being driven, in counter-rotating directions, the loads are balanced, but if only one engine is operational, the unbalanced thrust loads on the tower could cause a catastrophic failure and potentially serious damage and injuries. Therefore, the control box 48 is configured to shut down the other engine automatically if one of the engines should cease operating for any reason.

This feature is accomplished by means of a tachometer control unit 108, which monitors the revolutions per minute (RPM's) of each engine 16 and 18 continually during operation, through control lines 110 and 112, respectively. Should for example, the RPM's of engine 16 drop to such an extent as to indicate that the engine has ceased functioning, tachometer control unit 108 signals the control unit 114 for engine 18, through the control line 116, to shut down that engine. Controller 114, in turn, does so by sending a control signal through control line 118. Similarly, the reverse would occur if tachometer controller 108 were to sense the engine 18 cutting out. It would signal controller 120 through control line 122, which in turn would shut down the engine 18 through control line 124.

In operation, the device 10 would be towed to its intended point of use on trailer 12, with the second and third tower sections 32 and 36 retracted such as to be nested within the base section 28. Thus, the traveling height of the apparatus is essentially the height of the base section 28 plus a small additional increment to account for the ground clearance of the trailer bad 29. For example, in the preferred embodiment, base section 28 is approximately 10 feet, and the total height of the apparatus is approximately 12 feet in the retracted position. This height is sufficiently small to permit the rig to pass beneath just about any highway overpass, making it transportable almost anywhere.

When its operating location has been reached, jack stands 86 are extended to stabilize the rig for operation. Throttles 44 are then adjusted to the desired engine operating speed and the desired pitch of the propellers 20 and 22 is set. Following this, the operator has several options. He or she can crank up the twin second tower sections 32 to their maximum extension, which is approximately 8 feet above the top of the base tower section 28 in the preferred embodiment, then start the engines 16 and 18. The thrust generated by the propellers 20 and 22 causes the fly bar cross beam structure 38 to "fly away"; in essence to pull the third tower section tubes 36 to their maximum extension. In the preferred embodiment, this adds another 8 feet to the total height of the tower, thus making the total height of the tower approximately 26 feet, and the total height of the apparatus, including the trailer ground clearance, approximately 28 feet. The maximum operating height is especially useful when the fans are being used as frost fans for preventing frost damage to a vulnerable crop. In that setting, it is advantageous to attain a height sufficient to ensure that the propellers are above the colder inversion layer, so that they can pull down warmer, higher elevation air. The maximum height setting is also a safer setting, in that there is less risk of injury from the blades because they are not as accessible. Additionally, at a higher height, the wind machine is capable of affecting a greater area since there will be a wider dispersion of the moving air. However, there will also be instances where a lower height setting will be needed or desired. For example, there may not be enough clearance in the particular location to permit a full extension of the tower. Further, it may be desired to use the machine to dry asphalt, crops, or an athletic field, where warmer higher elevation air is not needed and where a more intense effect over a smaller area may be advantageous. In such an instance, the operator has a second option to operate the propellers 18 and 20 at their minimum height setting. In this scenario, the engines are started without cranking up the tower sections 32. Third tower section rods 36 will still "fly away" as described above, but the tower will now be only the combined height of the base section 28 and the extended height of the third section 33, which in the preferred embodiment would be about 18 feet, or 20 feet including the trailer ground clearance. A third option the operator has is to crank up the second sections 32 only part of the way. These sections may be cranked up any distance the operator desires. Thus, in essence the height of the tower is substantially infinitely adjustable between the heights of 18 and 26 feet in the preferred embodiment.

During the period of operation of the device, the fuel level 96 in upper tank 40 is monitored by float switch 102, and replenished as necessary by fuel pump 56, as discussed above. Also, performance of both engines is monitored automatically by the tachometer control 108 in order to ensure that if one engine shuts down for some reason, the other engine is immediately shut down to prevent damage or injury, again as discussed above. When it is desired to cease operation, the on/off switch at the control panel 48 may be actuated to shut down both engines 16 and 18 simultaneously. When the engines are shut down, the rod 36 will slide back down into tube 34 under the influence of gravity until it is completely retracted. The hydraulic oil in circumferential gap 88 acts as a damper during this return stroke, preventing damage from a too rapid descent. Then, second tower sections 32 may be cranked down and the jack stands 86 stowed for travel. At this point, the wind machine 10 is fully ready to be moved again.

Another important feature is that the trailer 12 can be towed through a crop with the propellers running for crop drying purposes. When this is done the propellers are prevented from flying the rods 36 by a cable (not shown) attached to the beam 38 and one of the lower tower sections 28. Other suitable means can be used to hold down the rods 36, if desired. For crop drying, the propellers are usually kept at a relatively low height.

The first two tower sections 28 and 32 could be configured to crank up individually rather than in tandem. In the alternative, the towers 24 and 26 could be comprised of different types of sections, such as hydraulically extendible sections, or could be comprised of a fewer or greater number of sections. The height of each section could also be different, depending upon the desired use for the machine. A fewer or greater number of towers could be used. Throttles 44 could be mounted at the control box 48, if desired. Additionally, the engines could be of a different type and the propellers could be manufactured of a different material or of a fixed pitch. A fewer or greater number of propellers could be used as well, as long as the resultant thrust loading on the entire device were substantially balanced. If a single propeller were employed, it would advantageously be rotatably mounted directly above the support tower, or directly above the center line of a plurality of support towers, in order to minimize the moment arm of the propeller and thereby minimize the thrust loading on the tower structure.

FIGS. 6-10 show a second embodiment of wind machine 201. Generally, the wind machine 201 comprises a wheeled Vehicle 203 movable along the ground, an adjustable height support 205 carried by the vehicle and extending upwardly substantially above the vehicle, and a transverse member 207 coupled to the support 205 and extending transversely of the support on both sides of the support. As explained more fully below, the transverse member 207 is pivotable between a travel position (FIGS. 6 and 7) in which the transverse member extends generally along the vehicle 203 in generally a direction from fore to aft of the vehicle and an operational position (FIG. 7A) in which the transverse member extends laterally of the vehicle. In the travel position, the transverse member 207 preferably extends along the longitudinal axis of the vehicle 203, and in the operational position, the transverse member preferably extends generally perpendicular to the longitudinal axis of the vehicle.

The wind machine 201 also includes identical propellers 209 mounted on the transverse member 207 on opposite sides of the support 205 for rotation about rotational axes 211, respectively. There is a tilt angle between each of the rotational axes 211 and a vertical plane. As can be seen by comparing FIGS. 6 and 7, this tilt angle is adjustable, and in this embodiment, it is adjustable 90 degrees between the position shown in FIG. 6 in which the rotational axes 211 are vertical to provide a tilt angle of zero degrees and the position of FIG. 7 where the rotational axes 211 are horizontal to provide a tilt angle of 90 degrees.

Figure 6:
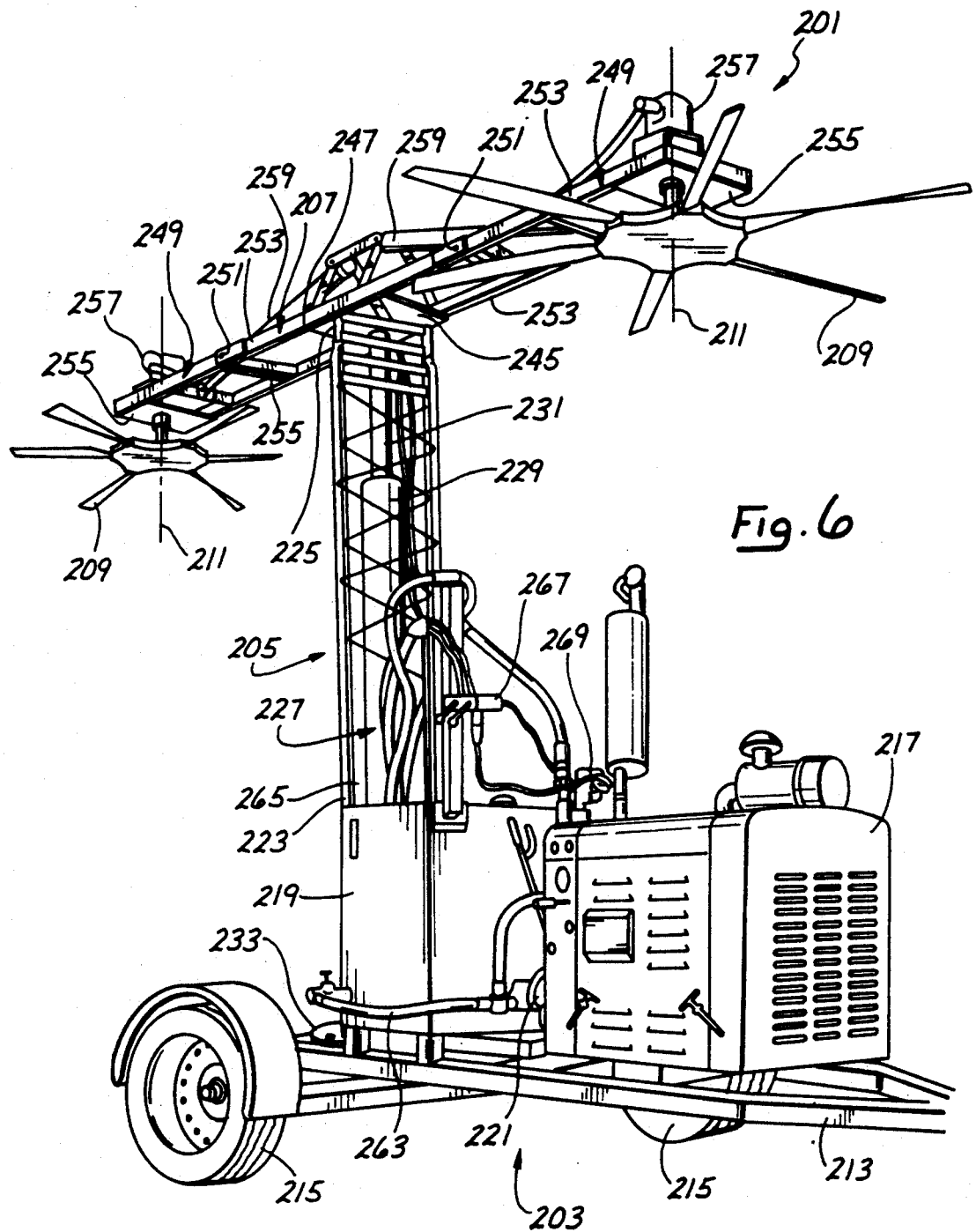
FIG. 6 is a perspective view of a second embodiment of wind machine with the transverse member in the traveling position, the support in the retracted position and the tilt angles being zero degrees such that the rotational axes of the propeller are vertical.
Figure 7:
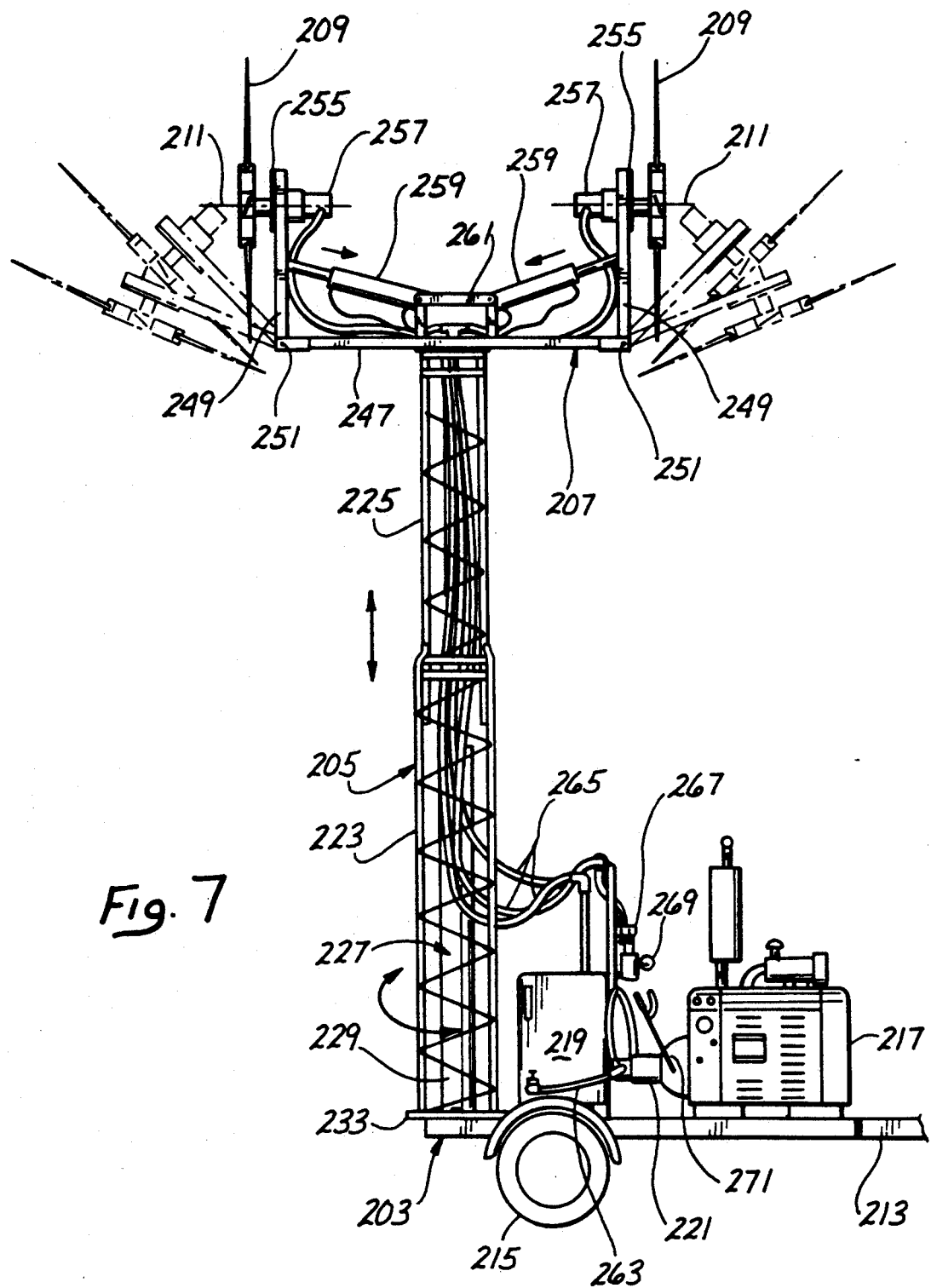
FIG. 7 is a side elevational view of the embodiment of FIG. 6 with the transverse member in the traveling position, the support in the extended position and with the tilt angles being 90 degrees such that the rotational axes of the propellers are horizontal. Other tilt angles are shown in dashed lines.

The vehicle 203 may be of virtually any kind and may be self propelled. However, in the illustrated embodiment, the vehicle 203 is in the form of a trailer and includes a frame 213 and wheels 215. A combustion engine 217, a hydraulic fluid reservoir 219 and the support 205 are mounted on the frame 213 as shown in FIGS. 6 and 7. A pump 221 is mounted on the engine 217.

In this embodiment, the support 205 is in the form of a tower which includes a lower section 223 mounted on the frame 213 and an upper section 225 mounted on the lower section for telescoping vertical movement between a lower or retracted position (FIG. 6) and an upper or extended position (FIG. 7). The support 205 may be a conventional, commercially available tower.

The upper section 225 may be raised or lowered in any suitable manner such as by a winch as illustrated by way of example in connection with the embodiment of FIGS. 1-5 or hydraulically as by a hydraulic ram 227. The ram 227, which may also be conventional, includes a housing 229 (FIG. 6) mounted on the frame 213 within the lower section 223 and an extendable rod 231 drivingly coupled to the transverse member 207 as best seen in FIG. 6.

Although the transverse member 207 can be pivoted between the traveling and operational positions in various different ways, in this embodiment, this is accomplished by mounting the lower section 223 of the support 225 on a mounting member or plate 233 (FIG. 8) which is in turn suitably rotatably mounted on the frame 213. In the construction shown in FIG. 8, the mounting plate 233 is annular and surrounds the ram 227 and is supported by a deck 235 of the frame 213 and, if desired, by bearings (not shown). The mounting plate 233 can be manually pivoted in either direction as shown by the arrow in FIG. 8 and retained in position by a bolt 237 which extends through any one of apertures 239, 241 or 243 and a mating opening 244 in the deck 235. Any number and any spacing of the apertures 239, 241 and 243 may be employed, although the 90 degree spacing shown in FIG. 8 is preferred so there will be 90 degrees between the traveling and operational positions. Of course, intermediate positions can be employed, if desired.

The transverse member 207 is elongated and provides the necessary structure for rotatably mounting the propellers 209. In this embodiment, the transverse member 207 comprises a plurality of elements including a plate 245 (FIG. 6) coupled to the rod 231 and the upper section 225 to thereby mount the transverse member on the upper section 225.

The transverse member 207 includes an inner section 247 (FIGS. 6 and 7) and identical outer sections 249 pivotally coupled to the inner section for pivotal movement about tilt axes 251. The angular position of the outer sections 249 about their respective tilt axis 251 defines the tilt angle, i.e. the angle of the axis 211 with respect to a vertical plane. Of course, the tilt angle can be adjusted in different ways if desired.

The transverse member 207 is elongated and is of sufficient length to provide the desired displacement of the propellers 209 laterally of the vehicle 203 in the operational position. Although various different constructions may be employed, in the embodiment illustrated, the inner section 247 and both of the outer sections 249 comprise elongated rails 253 joined together by appropriate cross members 255 as well as the plate 245 (FIG. 6).

The propellers 209 are mounted for rotation on cross members 255, respectively, closely adjacent the opposite ends of the transverse member 207. Identical hydraulic motors 257 are mounted co-axially with the propellers 209, respectively, to drive the associated propeller. The power source for rotating the propellers includes the pump 221, the fluid motors 257 and the engine 217.

Fluid actuators 259, which are preferably hydraulic, are attached at their inner ends to a mounting portion 261 of the transverse member 207 and at their outer ends to the outer sections 249, respectively. The actuators 259, which are preferably double-acting, pivot the associated outer section 249 about the associated tilt axis 251 to adjust the tilt angle of the associated propellers 209. The actuators 259 also provide a stop for fixing the associated outer section 249 in any one of an infinite number of positions about the associated tilt axis 251 to thereby establish the tilt angle for the associated propeller 209.

The maximum and minimum tilt angles can be selected as desired, but preferably the tilt angle allows the rotational axes 211 to be vertical. In this embodiment, the rotational axis may be horizontal, and accordingly each of the tilt angles in this embodiment may be adjusted through 90 degrees, although a lesser range of tilt angles of 22 degrees or 45 degrees may be employed, if desired.

The pump 221 provides fluid under pressure to operate the ram 227, the motors 257 and the actuators 259. To accomplish this, the motor 221 draws hydraulic fluid from the reservoir 219 through a supply hose 263 and furnishes hydraulic fluid to each of these hydraulic components through flexible hoses 265, some of which are illustrated in FIGS. 6 and 7. A conventional control valve 267 can be used to allow for manually control of the actuators 259 and a pressure relief valve 269 provides for fluid pressure release back to the reservoir 219 in case of over-pressurizing of the hydraulic fluid. The plumbing system for the hydraulic components of the wind machine 201 may be conventional and form no part of the invention; however, it is preferred to have the hydraulic motors 257 mounted on the transverse member 207 adjacent the associated propeller 209. A manually operable clutch 271 allows the pump 221 to be drivingly engaged with or disengaged from the engine 217 as desired.

In use of the wind machine 201, the mounting plate 233 (FIG. 8) is positioned to place the transverse member 207 in the travel position of FIG. 6 and the bolt 237 is inserted through the aperture 241 and the associated aperture 244 in the deck 235 to lock the transverse member in the travel position. In addition, the actuators 259 are actuated to adjust the tilt angles to place the axes 211 of the propellers 209 in the vertical position of FIG. 6 and the support is put in the retracted position of FIG. 6. With the wind machine 201 in this position, it can be pulled by a suitable powered vehicle to an area where artificial wind is desired. In the travel position, the width of the wind machine 201 is acceptable for traveling over highways, and with the rotational axes 211 vertical and the upper section 225 of the support 205 retracted (FIG. 6), the height of the wind machine is sufficiently small so that it can pass through overcrossings of normal highway clearance. For example, the overall height of the wind machine in this position may be about 12 to 13 feet.

When the desired area is reached, the bolt 237 (FIG. 8) is removed and the mounting plate 233 is manually rotated through 90 degrees to place the transverse member 207 in the operational position of FIG. 7A and the bolt 237 is reinserted through the aperture 243 and the associated opening 244 in the deck 235 to lock the transverse member in the operational position. In the operational position, the propellers 209 lie completely laterally outwardly of the vehicle 203 in all of the tilt angles (FIG. 7A). Of course, the transverse member 207 can be of different lengths, but it is preferred that at least major portions of the propellers 209 be located laterally outwardly of the vehicle 203 in all of the tilt angles. Also, it is preferred that the rotational axes 211 be located laterally outwardly of the sides of the vehicle 203 when the rotational axes are vertical.

Various operating sequences may be employed. For example, the ram 227 may be operated to move the support 205 to the desired height such as the extended position of FIG. 7. The actuators 259 are then actuated to adjust the tilt angles so that the rotational axes 211 of the propellers 209 extend in the desired direction. For example, with the rotational axes 211 horizontal, the wind machine is adapted for crop warming, with the rotational axes 211 between the vertical and horizontal the wind machine is adapted for drying racetracks and fruit crops or trees and with the rotational axes 211 vertical, the wind machine is adapted to, for example, blow nuts and figs off trees for harvesting and to dry row and vine crops.

Next, the motors 257 are energized to rotate the propellers 209. The motors 257 have a variable speed capability so that the rotational velocity of the propellers 209 can be adjusted. Also, the propellers 209 are preferably of adjustable pitch so that the quantity and velocity of air moved by the propellers can be adjusted. In this embodiment, the pitch of the propellers 209 is manually adjustable when the motors 257 are not running.

Finally, the wind machine may be pulled in the area where artificial wind is desired with the transverse member in the operational position, the tilt angles and height of the support 205 adjusted as desired and the propellers rotating.

FIG. 9 shows an optional feature for oscillating the support 205 in the travel position. In the construction of FIG. 9 a hydraulic actuator 281 is removably coupled at one end to the deck 235 and at the other end to the mounting plate 233. The actuator 281 can be controlled by an appropriate conventional valve (not shown) to oscillate the mounting plate 233 through a small angle. This oscillates the support 205, the transverse member 207 and the propellers 209 about a vertical pivot or oscillatory axis.

In use, the actuator 281 is initially disconnected from the deck 235 and the mounting plate 233, and the mounting plate 233 is rotated to place the transverse member 207 in the operational position of FIG. 7A. The actuator 281 is then coupled to the mounting plate 233 and to the deck 235 as shown in FIG. 9. The bolt 237 is not inserted through the aperture 243 so that the actuator 281 can be extended and retracted in accordance with a predetermined program to oscillate the mounting plate 233.

FIG. 10 shows a modification in which a shroud 283 is provided for one of the propellers 209. An identical shroud 283 may be provided for the other propeller 209, if desired. The shroud 283 is suitably mounted on the transverse member 207 and is usable to increase the air velocity. This is useful, for example, in blowing water off of a racetrack or street. The shroud 283 is removably mounted on the transverse member 207 because it is typically not desired for use in blowing water off of or drying crops.

Although exemplary embodiments of the invention have been shown and described, many changes, modifications and substitutions may be made by one having ordinary skill in the art without necessarily departing from the spirit and scope of the invention.

I claim:

1. A portable wind machine comprising:
   a vehicle movable along the ground;
   a support carried by the vehicle and extending upwardly substantially above the vehicle;
   a transverse member coupled to the support at a location substantially above the vehicle and extending transversely of the support on both sides of the support;
   said transverse member being pivotable between a travel position in which the transverse member extends generally along the vehicle in generally a direction from fore to aft of the vehicle and an operational position in which the transverse member extends laterally of the vehicle;
   first and second propellers mounted on the transverse member on opposite sides of the support for rotation about first and second rotational axes, respectively, a tilt angle between each of said rotational axes and a vertical plane being adjustable; and
   at least one power source for rotating the propellers.

2. A portable wind machine as defined in claim 1 wherein at least major portions of the first and second propellers are located laterally outwardly of the vehicle in the operational position in all of said tilt angles.

3. A portable wind machine as defined in claim 1 wherein substantially all of the first and second propellers are located laterally outwardly of the vehicle in the operational position in all of said tilt angles.

4. A portable wind machine as defined in claim 1 wherein the tilt angle for at least said first propeller is adjustable to allow said first rotational axis to be generally vertical.

5. A portable wind machine as defined in claim 1 wherein the tilt angles are adjustable to allow said first and second rotational axes to be generally vertical, the wheeled vehicle has opposite sides, said first rotational axis when generally vertical is located laterally outwardly of one of said sides in the operational position and the second rotational axis when generally vertical is located laterally outwardly of the other said sides in the operational position.

6. A portable wind machine as defined in claim 1 wherein said transverse member includes an inner section coupled to the support and an outer section, said first propeller is mounted on the outer section, said outer section is pivotally coupled to the inner section for pivotal movement about a tilt axis to adjust the tilt angle for the first propeller, and the wind machine includes a stop for fixing the outer section in any of a plurality of positions about the tilt axis to establish the tilt angle for the first propeller.

7. A portable wind machine as defined in claim 6 including a fluid actuator for pivoting the outer section about said tilt axis for the first propeller to adjust the tilt angle for the first propeller.

8. A portable wind machine as defined in claim 1 wherein said transverse member includes an inner section coupled to the support and first and second outer sections, said first and second propellers are mounted on the first and second outer section, respectively, each of said outer sections is pivotally coupled to the inner section for pivotal movement about a tilt axis to adjust the tilt angle for the associated propeller, a first actuator for pivoting the first outer section about the tilt axis for the first propeller to adjust the tilt angle for the first propeller and a second actuator for pivoting the second outer section about the tilt axis for the second propeller to adjust the tilt axis for the second propeller.

9. A portable wind machine as defined in claim 8 wherein at least major portions of the first and second propellers are located laterally outwardly of the vehicle in all of said tilt angles in the operational position.

10. A portable wind machine as defined in claim 8 wherein the tilt angles ar adjustable to allow said first and second rotational axes to be generally vertical, the wheeled vehicle has opposite sides, said first rotational axis when generally vertical is located laterally outwardly of one of said sides in the operational position and the second rotational axis when generally vertical is located laterally outwardly of the other of said sides in the operational position.

11. A portable wind machine as defined in claim 1 wherein the support includes an adjustable height support.

12. A portable wind machine as defined in claim 11 wherein the adjustable height support includes first and second extendible towers.

13. A portable wind machine as defined in claim 1 wherein the tilt angle for the first propeller is adjustable through at least about 22 degrees with the first rotational axis being substantially vertical in one of the tilt angles for the first propeller.

14. A portable wind machine as defined in claim 13 wherein the tilt angle for the first propeller is adjustable through at least about 45 degrees.

15. A portable wind machine as defined in claim 13 wherein the tilt angle for the first propeller is adjustable through at least about 90 degrees.

16. A portable wind machine as defined in claim 1 wherein the power source includes a fluid motor carried by the transverse member for driving the first propeller, a pump for providing fluid under pressure to drive the fluid motor and an engine on the vehicle to drive the pump.

17. A portable wind machine as defined in claim 1 wherein the support is mounted on the vehicle for pivotal movement about a generally vertical pivot axis relative to the vehicle whereby the transverse member is pivotable between said travel position and said operational position.

18. A portable wind machine as defined in claim 17 including an actuator carried by the vehicle for oscillating the support about said pivot axis.

19. A method of providing artificial wind using a wind machine which includes a vehicle movable along the ground, a support carried by the vehicle and extending upwardly substantially above the vehicle, a transverse member coupled to the support at a location substantially above the vehicle and extending transversely of the support on both sides of the support, said transverse member being pivotable between a travel position in which the transverse member extends generally along the vehicle in generally a direction from fore to aft of the vehicle and an operational position in which the transverse member extends laterally of the vehicle, first and second propellers mounted on the transverse member on opposite sides of the support for rotation about first and second rotational axes, respectively, a tilt angle between each of said rotational axes and a horizontal plane being adjustable, and at least one power source for rotating the propellers, said method comprising:

moving the portable wind machine to an area where artificial wind is desired with the transverse member being in the travel position;

moving the transverse member to the operational position and adjusting the tilt angles;

rotating the propellers; and moving the wind machine in the area where artificial wind is desired with the transverse member in the operational position and the propellers rotating.

20. A method as defined in claim 19 wherein the first mentioned step of moving is carried out with the first and second rotational axes generally vertical.

21. A method as defined in claim 19 including adjusting the height of the support.

22. A portable wind machine comprising:

at least one support tower;

a readily transportable platform;

means for mounting the support tower on the platform with the tower extending upwardly whereby the platform can be used to transport the tower;

at least one propeller;

means for mounting the propeller for rotation on the support tower adjacent an upper end of the tower;

at least one power generating means, said at least one power generating means being drivingly coupled to the propeller to rotate the propeller;

said at least one support tower including a plurality of sections, said plurality of sections being telescopically connected to one another such that the height of said at least one propeller above said platform varies substantially by extending and retracing said telescoping sections;

said power generating means including an engine mounted on the support tower adjacent the upper end of the support tower;

an upper fuel tank mounted near said engine;

a lower fuel tank adapted to be mounted near a base end of said at least one support tower;

a fuel pump;

a fuel line extending upwardly from said lower fuel tank to said upper fuel tank, said fuel pump being adapted to pump fuel through said fuel line from said lower fuel tank to said upper fuel tank;

said upwardly extending fuel line further comprising a first rigid conduit portion, said first conduit portion extending upwardly along a lowermost of said plurality of support tower sections and a second flexible hose portion, said second flexible hose portion extending upwardly from the top of said first rigid conduit portion to said upper fuel tank, and having sufficient extra length to compensate for the difference in tower height when said telescoping tower sections are retracted and when they are extended; and a hose collector means, said hose collector means being mounted to said at least one support tower and being adapted to store the excess length of said second flexible hose portion when said telescoping tower sections are retracted.

* * * * *